United States Patent [19]

Mann et al.

[11] 3,952,600

[45] Apr. 27, 1976

[54] SELF-EQUILIBRATING BALANCE

[75] Inventors: Adriaan B. Mann; Jacobus J. C. Vermeulen, both of Delft, Netherlands

[73] Assignee: Stichting Waterbouwkundig Laboratorium, Delf, Netherlands

[22] Filed: Mar. 26, 1974

[21] Appl. No.: 454,815

[30] Foreign Application Priority Data

Mar. 30, 1973 Netherlands.................. 7304524

[52] U.S. Cl................................ 73/433; 73/141 R; 177/213
[51] Int. Cl.²......................................... G01G 1/38
[58] Field of Search............. 73/433, 141 R, 141 A; 177/213, 214, 195, 212

[56] References Cited
UNITED STATES PATENTS

| | | | |
|---|---|---|---|
| 1,149,378 | 8/1915 | McGarvey | 177/214 |
| 1,484,358 | 2/1924 | Norton | 177/214 |
| 2,622,868 | 12/1952 | Yeasting | 177/214 |

FOREIGN PATENTS OR APPLICATIONS 731,894  9/1932  France................. 177/213

Primary Examiner—Richard C. Queisser
Assistant Examiner—Stephen A. Kreitman
Attorney, Agent, or Firm—Mason, Mason & Albright

[57] ABSTRACT

An accurate measuring balance for measuring forces or pressures, comprising a travelling mass for bringing a balance arm to equilibrium, which travelling mass is shaped as a body of revolution which can roll on the upper edge of the balance arm, and is mounted in a frame which is movable by an electric motor in the longitudinal direction of the balance arm. The frame comprises rotatable members contacting, in the equilibrium position of the balance, the body at both sides in the horizontal median plane.

8 Claims, 4 Drawing Figures

SELF-EQUILIBRATING BALANCE

BACKGROUND OF THE INVENTION

1. Field of the Invention.

This invention relates to a self-equilibrating measuring balance for example for use in weighing articles or for monitoring varying pressures.

2. Description of the Prior Art.

For measuring water movements and water level changes, for instance in the sea or in waterways, use is conventionally made of a pressure sensor arranged at the measuring point, and comprising a cell closed by an elastically-deformable wall, which cell is connected by a first duct to a source of compressed air with a constant air supply, and which by means of a second duct communicates with the ambient air, a pressure gauge being, furthermore, connected to the supply duct. The pressure measured by this pressure gauge is correlated with the flow resistance caused by the cell, which, in turn, is correlated with the deflection of the deformable wall, and, therefore, with the pressure at the location of the sensor. In this manner it is possible remotely to measure pressures, and more particularly continuously varying pressures, with high sensitivity. The pressure variations correlated to water levels and water movements have to be recorded over very long periods so that recording instruments are used. Since, generally, the recording instruments are positioned in remote places in which often no electricity supply is available, these instruments should be as simple and reliable as possible, and should be provided with individual energy sources so as to be anble to work without maintenance for a relatively long time. Therefore simple mechanical recording instruments, for instance with a clockwork drive, and simple reliable pressure gauges are preferred.

For such purposes it has been proposed to use a selfequilibrating balance comprising a balance arm supported on a fulcrum and provided, at one end, with a fixed mass, a pressure sensing cell suitable for sensing the pressure being connected to said arm. Furthermore, a travelling mass is mounted on this balance arm, which is movable by means of a screwed spindle driven by an electric motor, the latter being controlled by means of a circuit comprising two contacts co-operating with a contact finger at one end of the balance arm, so as to cause the motor to rotate in a sense such that the travelling mass is displaced so as to restore the equilibrium of the balance. This screwed spindle is coupled to a mechanical recording instrument for recording the pressure measured.

Such a pressure measuring mechanism operates reliably, the electrical motor for displacing the travelling mass needing very little current, and thus being able to run for an adequate length of time on batteries. Together with a mechanical recorder with a clock-work drive a very reliable unit is obtained, which can operate for a relatively long period without maintenance. At intervals the batteries are to be replaced and the clockwork is to be wound, but this can be done when the paper-roll with te pressure record is taken away for processing.

Previously proposed measuring balances, however, appear to have, at a pressure of for instance 10 to 20 m. of water, a measuring error of about 1 to 2%, i.e., about 100 to 200 mm. of water, which inaccuracy is too large for some purposes. This inaccuracy is, perhaps, a consequence of the fact that a very accurate adjustment of the travelling weight moved along a rod is not possible because of the friction and inertia of the weight, and of the unavoidable lost motion in the driving members acting on the weight, and possibly also as a consequence of friction between these driving members and the mass which influence the latter's vertical movements. The spring reaction of the contact springs can also be a disturbing factor promoting overshooting of the equilibrium position, and the restoration thereof is delayed or prevented by the aforementioned factors.

It is an object of the invention to provide a selfequilibrating measuring balance which has a substantial improvement in its accuracy in comparison with previously proposed balances.

SUMMARY OF THE INVENTION

According to the present invention there is provided a self-equilibrating balance for measuring progressively changing parameters, a balance arm, means defining a fulcrum supporting said balance arm, a fixed mass mounted at one end of the balance arm, means for applying a force related to said parameter to the arm, a screwed spindle extending alongside the balance arm, a travelling mass mounted on the screwed spindle, said travelling mass having the shape of a body of revolution arranged to roll along the upper edge of the balance arm and comprising a frame mounted on said screwed spindle and confining the body of revolution, two driving members mounted on the frame and both contacting in the equilibrium position of the balance arm the body of revolution substantially without friction, and guide means serving to maintain the body of revolution centrally, in the transverse sense, on the arm, drive means for the travelling mass, and guide means for the frame extending parallel to the balance arm.

Preferably the body of revolution is a sphere, the driving members and guide means contacting the sphere in the equilibrium position in the sequential plane of the sphere. These driving members and guide means may be wheels or balls in order to obtain substantially rolling friction.

The fixed contact springs co-operating with the contact finger of the balance arm may be in the form of L-shaped wires, one leg of each wire being clamped near its extremity, and extending substantially horizontally, and the other legs being positioned symmetrically at an angle with respect to the horizontal plane, the contact finger of the balance extending in the V-shaped space between these legs.

DESCRIPTION OF THE PREFERRED EMBODIMENT

Figure 1:
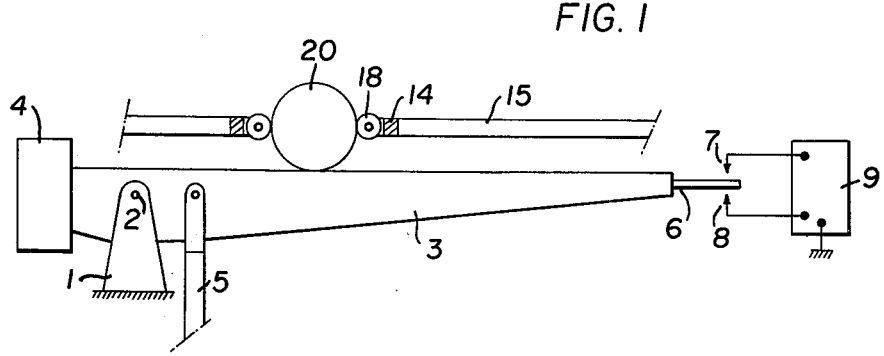
FIGS. 1 and 2 are, respectively, a diagrammatic side view with parts broken away and a diagrammatic plan view of one embodiment of a balance in accordance with the invention.
Figure 2:
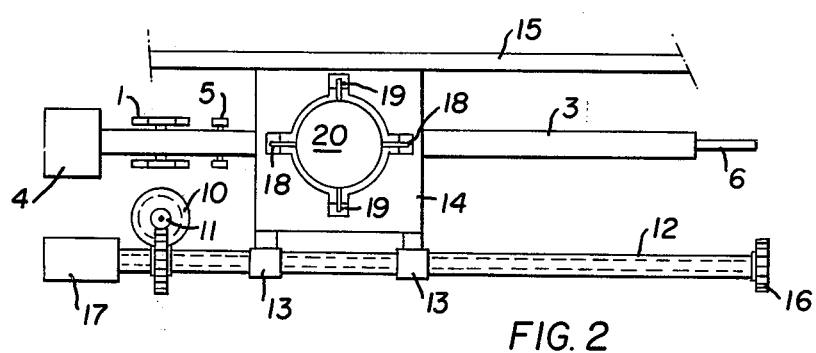

The balance shown comprises a fixed support 1 and a fulcrum 2 for supporting a balance arm 3 provided, at one end, with a fixed mass 4, and, furthermore, a rod 5 is coupled to this arm 3, which rod is adapted to transmit the force to be measured to the arm. For measuring pressures, this rod will be connected for example, to a pressure-sensing cell. At the other end of the arm 3 a contact finger 6 is provided which is arranged to contact fixed contact springs 7 and 8 on leaving the equilibrium position, these contact springs being connected in an electric circuit 9 for controlling a reversible electric motor 10, the contact finger 6 also being connected in the circuit through the arm.

The motor 10 is coupled by means of gears 11 to a horizontal screwed spindle 12 supported in bearings, not shown. On this spindle one or more nuts 13 connected to a slide 14 are provided, which slide is slidable in a horizontal guide 15. A sprocket wheel 16 for driving a recording apparatus is mounted on the spindle 12, and, furthermore, this spindle can be coupled to a digital counter 17 indicating the number of revolutions of the spindle corresponding to the position of the slide 14 on the guide 15 and on the arm 3.

Two pairs of thin wheels or discs 18 and 19 respectively are supported on pins mounted on the slide 14, the wheels 18 lying in the vertical median plane of the balance arm, and the wheels 19 lying in a vertical plane normal to that of the wheels 18. a travelling mass in the form of a sphere 20 is situated between the wheels 18 and 19 which is adapted to roll on the upper edge of the balance arm 3. The first pair of wheels 18 acts as driving members. The wheels 18 and 19 are so positioned that in the equilibrium position of the arm 6, they all contact the equator of the sphere 20, the contact being substantially point-wise, and virtually no play is present.

Figure 3:
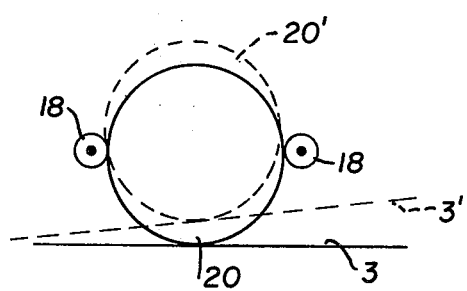
FIG. 3 is a view, to an enlarged scale, of a travelling weight of the balance shown in two different positions.

FIG. 3 shows, to an enlarged scale, the relative position of the sphere 20 and wheels 18. In the equilibrium position shown in continuous lines, both wheels 18 contact the equator of the sphere 20 substantially point-wise. When, on disturbing the equilibrium, the balance arm takes up the position indicated with broken lines, the sphere 20 must be moved uphill, i.e. to the right in FIG. 3, so that on moving the slide 14 the sphere will be driven along by the wheel 18 at the lower side. Since the wheels 18 are now situated lower than the equatorial plane of the sphere, and, therefore, in front of a smaller parallel circle of this sphere, some play will be present, and the sphere 20 will be driven by gravity against the wheel 18 at the lower side and this brings about movement of the sphere. The other wheel 18 is, then, unloaded and remains at a short distance from the sphere. This automatically obtained play in respect of the inoperative wheel prevents generation of jamming or friction forces during the upward displacement of the sphere, and this play becomes smaller as the equilibrium position is approached. In the equilibrium position the play completely disappears, so that this position is unambiguously defined.

Lateral support can also be provided by guide means, such as wheels similar to wheels 18, as shown. On leaving the equilibrium position some lateral play will develop which is, generally, admissible. Instead of the wheels, vertical ribs can be used which always contact the equator of the sphere, so that no lateral play will occur. Balls or horizontal wheels can also be used, in particular for lateral support, and these generate slightly less friction.

Instead of a sphere a flat circular disc can be used which is similarly carried by two wheels, and which, for instance, can be provided at both sides with a central ball, which balls bear against the flat side edges of the slide 14. Also lateral support by means of two or more wheels is possible. However a sphere has a smaller contact surface and has better lateral stability.

Figure 4:
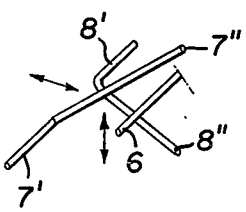
FIG. 4 is a perspective view of a contact assembly of the balance.

FIG. 4 shows a preferred embodiment of the contact springs 7 and 8 cooperating with the contact finger 6. These springs comprise L-shaped wires, made, for example, of gold, one leg 7', 8' of each spring being horizontally oriented and being clamped near its free end so that these legs act as torsion springs. The other legs 7'' and 8'' extend substantially symmetrically with respect of the horizontal. The contact finger 6 extends into the V-shaped interspace between these legs, and on contacting and slightly bending a leg 7''or 8'', the finger 6 will scrape along said finger so that a self-cleaning action, and, moreover, a small damping is obtained. The contact reaction is very small which is important since, at the accuracy and sensitivity obtained in this balance, this reaction will play an important part. Such contact springs can easily be arranged accurately symmetrically, and can also be made jointly adjustable transversely to the direction of the contact finger 6 so that the sensitivity can be adjusted. Although this balance has, in the first place, been designed for the aforesaid pressure measurements, it will be clear that it is also suitable for other force measurements.

We claim:
1. In a self-equilibrating balance for measuring a progressively changing parameter,
   a balance arm,
   means defining a fulcrum supporting said balance arm,
   a fixed mass mounted at one end of the balance arm,
   means for applying a force related to said parameter to the arm,
   a screwed spindle extending alongside the balance arm,
   a travelling mass mounted on the screwed spindle, said travelling mass having the shape of a body of revolution being arranged to roll along the upper edge of the balance arm and comprising
   a frame mounted on said screwed spindle and confining the body of revolution,
   two rotary driving members mounted on the frame and both contacting only in the equilibrium position of the balance arm the body of revolution substantially without friction at an equatorial plane, the arrangement being such that in all unbalanced conditions only one said rotary driving member contacts the body, and
   centering means serving to maintain the body of revolution centrally, in the transverse sense, on the arm,
   drive means for the travelling mass separated from the balance arm, and
   guide means for the frame extending parallel to the balance arm.
2. A balance according to claim 1, comprising
   an electrical contact finger secured at the end of the arm remote from the fixed mass,
   a first electrical contact arranged to cooperate with the finger and
   a second electrical contact arranged to cooperate with the finger, said drive means comprising
   an electric motor coupled to the screwed spindle and
   an electrical circuit for said motor and incorporating said finger and said contacts.

3. A balance according to claim 1, wherein the body of revolution is a sphere.

4. A balance according to claim 1, wherein the rotary driving members mounted on the frame are wheels rotatably mounted in said frame.

5. A balance according to claim 1 wherein the rotary driving members mounted on the frame are balls rotatably supported in said frame.

6. A balance according to claim 2 wherein the contacts have the shape of L-shaped wires, one leg of each wire being clamped near its extremity and being oriented substantially horizontally, the other leg being positioned symmetrically at an angle in respect of the horizontal plane, and the contact finger extending in the V-shaped space defined by the legs lying at an angle with respect to the horizontal plane.

7. A balance according to claim 6, wherein the clamped legs of the contacts are adjustable transversely to the direction of the contact finger.

8. A balance according to claim 1, wherein the centering means are wheels rotatably mounted in the frame.

* * * * *